United States Patent
Motoda

(10) Patent No.: US 9,855,690 B2
(45) Date of Patent: Jan. 2, 2018

(54) INJECTION MOLDING RESIN GEAR AND METHOD OF MANUFACTURING THE SAME

(71) Applicant: CANON KABUSHIKI KAISHA, Tokyo (JP)

(72) Inventor: Kazunori Motoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 14/520,726

(22) Filed: Oct. 22, 2014

(65) Prior Publication Data

US 2015/0174804 A1    Jun. 25, 2015

(30) Foreign Application Priority Data

Dec. 24, 2013    (JP) .................................. 2013-265723

(51) Int. Cl.
| | |
|---|---|
| F16H 55/17 | (2006.01) |
| B29C 45/00 | (2006.01) |
| F16H 55/06 | (2006.01) |
| B29L 31/32 | (2006.01) |
| B29L 15/00 | (2006.01) |

(52) U.S. Cl.
CPC ......... *B29C 45/0046* (2013.01); *F16H 55/06* (2013.01); *B29C 2045/0027* (2013.01); *B29L 2015/003* (2013.01); *B29L 2031/322* (2013.01); *F16H 2055/065* (2013.01); *Y10T 74/1987* (2015.01)

(58) Field of Classification Search
CPC ........ B29C 2045/0027; B29C 45/0025; B29C 45/2708; F16H 2055/065; Y10S 74/10; B29L 2015/003; B29D 15/00
See application file for complete search history.

(56) References Cited

U.S. PATENT DOCUMENTS

| | | | |
|---|---|---|---|
| 6,941,832 B2 * | 9/2005 | Noguchi | B29C 45/0046 264/478 |
| 7,406,891 B2 * | 8/2008 | Miyasaka | B29C 45/0025 425/542 |

(Continued)

FOREIGN PATENT DOCUMENTS

| | | |
|---|---|---|
| EP | 1484152 A1 | 12/2004 |
| EP | 1548329 A2 | 6/2005 |

(Continued)

*Primary Examiner* — William Kelleher
*Assistant Examiner* — Jake Cook
(74) *Attorney, Agent, or Firm* — Canon U.S.A., Inc. IP Division

(57) ABSTRACT

An injection molding resin gear includes: a tooth portion having teeth formed on an outer peripheral portion thereof; a shaft supporting portion formed around a center of rotation; and a web that connects the tooth portion and the shaft supporting portion, wherein the web includes a concave and convex portion having a concave portion formed on a first surface and a convex portion formed on a second surface formed at a position corresponding to the concave portion, and one of the concave portion or the convex portion of the concave and convex portion includes a gate point, and the concave and convex portions include a thinned portion at radial end portion in a radial cross section passing through the center of rotation of the concave and convex portion.

18 Claims, 6 Drawing Sheets

(56) References Cited

U.S. PATENT DOCUMENTS

| | | | | |
|---|---|---|---|---|
| 8,444,904 B2* | 5/2013 | Miyauchi | ............... | F16H 55/06 264/328.1 |
| 2008/0066570 A1* | 3/2008 | Kashimura | ........... | B29C 33/005 74/439 |
| 2009/0011071 A1* | 1/2009 | Hagihara | ............ | B29C 45/0025 425/573 |

FOREIGN PATENT DOCUMENTS

| JP | H01-299363 A | 12/1989 |
|---|---|---|
| JP | H04-080956 A | 7/1992 |
| JP | H04-080957 A | 7/1992 |
| JP | H09-166199 A | 6/1997 |
| JP | 2000-000852 A | 1/2000 |
| JP | 2005-180595 A | 7/2005 |
| JP | 4173053 B2 | 10/2008 |
| JP | 2011-031470 A | 2/2011 |

* cited by examiner

FIG. 5A
PRIOR ART
FIG. 5B
PRIOR ART
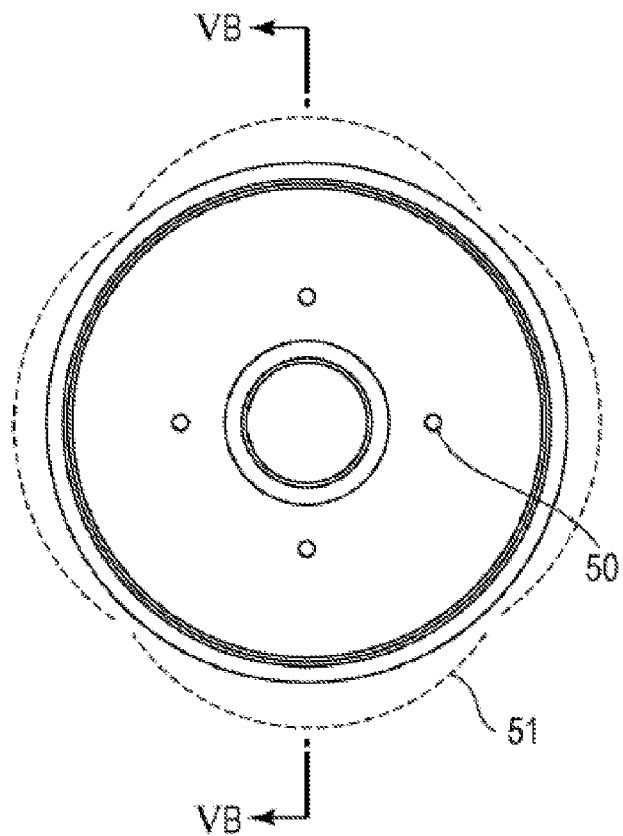
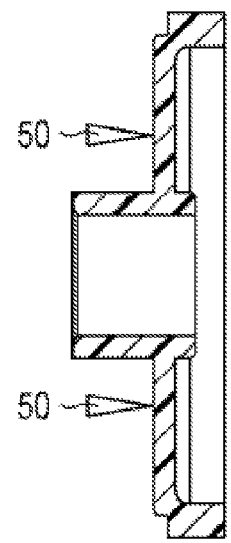

INJECTION MOLDING RESIN GEAR AND METHOD OF MANUFACTURING THE SAME

BACKGROUND

Field of the Invention

This disclosure relates to an injection molding resin gear and a method of manufacturing the injection molding resin gear and, more specifically, to an injection molding resin gear including a tooth portion having teeth formed on an outer periphery thereof, a shaft supporting portion formed around a center of rotation, and a web that connects the tooth portion and the shaft supporting portion.

Description of the Related Art

In the related art, a number of injection molding resin gears are used as a power transmitting component for machines such as copying machines and printers. In this field of application, requirement of accuracy of the injection molding resin gears is significantly increased for improving the quality of printing.

The injection molding resin gear is molded by infusing resin from multi-point gates opening on a web surface. In this case, since the resin infused from the gates is filled in a cavity radially, the resin reaches the tooth portion on an outer peripheral portion earlier than an intermediate position between the gates in the circumferential direction of a gear at positions matching the gates in the circumferential direction of the gear, so that resin filling to the tooth portion becomes uneven, which adversely affects a tooth plane accuracy standardized by an engagement error (Japanese Gear Manufacturers Association standard number 116-02 (JGMA 116-02)) or the like.

As a method of enhancing the accuracy of the injection molding resin gear, a method of disposing an annular groove shape for rectification at a position in the midcourse of a resin flow to rectify the flow is known. As described in Japanese Patent No. 4173053, a method of disposing a groove shape in the vicinity of the gates to restrain a resin flow (known technology) is reported. Alternatively, as described in Japanese Patent Laid Open No. 2011-31470, a method of forming a rib so as to project upright on a portion on the outer peripheral side of the gates of the web, adjusting the height of the rib so as to be high at positions corresponding to the gates and low in the intermediate positions between the gates in the circumferential direction to form buffering areas which diverse the resin flow from the gates toward the outer peripheral portion, whereby complementing resin reaching timing to the outer peripheral portion of a mold is reported.

However, with the annular groove shape for rectification provided in the midcourse of the flow of the related art or with the method of disposing the groove shape in the vicinity of the gates as described in Japanese Patent No. 4173053, in order to obtain an advantage of sufficient improvement of tooth plane accuracy, if the web is a gear having a large diameter and a large thickness, no problem arises. However, since achievement of high-accuracy and compact configuration is in progress, in the case of high accuracy injection molding resin gear having an outer diameter as small as Φ30 mm to Φ45 mm and a thickness of 1.5 to 2.0 mm such as color printers and copying machines of the recent years, if the groove for achieving the effect of rectification is disposed, there arises a problem of lowering of the strength of the gear due to the thinning of the groove portion, and lowering of accuracy of a tooth plane and the shaft supporting portion because the groove shape is provided as a position close thereto.

In Japanese Patent Laid Open No. 2011-31470, since the rib is disposed on the outer peripheral side of the gate, an influence on the accuracy of the tooth plane is a concern in the case of the injection molding resin gear having a small diameter. In addition, in order to obtain a sufficient effect, the thickness of the rib needs to be increased, and hence deformation of the web is a concern. Alternatively, the height of the web needs to be changed right below the rib, so that the flexibility of a design may be reduced.

In this manner, in the related art, there is a problem of unevenness due to resin flow caused by the arrangement of the gates in the web.

SUMMARY OF THE INVENTION

In view of the problems of the related art described above, this disclosure provides an injection molding resin gear having a high degree of accuracy in which the non-uniformity of a resin flow caused by the arrangement of gates in a web is resolved, and a method of manufacturing the injection molding resin gear.

In order to solve the above-described problems, there is briefly described, in an example embodiment, an injection molding resin gear including a tooth portion having teeth formed on an outer peripheral portion thereof, a shaft supporting portion formed around a center of rotation, and a web that connects the tooth portion and the shaft supporting portion, wherein the web includes a concave and convex portion having a concave portion formed on a first surface and a convex portion formed on a second surface formed at a position corresponding to the concave portion, one of the concave portion and the convex portions of the concave and convex portion includes a gate point, and the concave and convex portions include a thinned portion in a radial cross section passing through the center of rotation of the concave and convex portion.

In order to solve the above-described problem, there is briefly described, in an example embodiment, a method of manufacturing an injection molding resin gear including: a tooth portion formed in an outer peripheral portion thereof; a shaft supporting portion formed around a center of rotation, and a web that connects the tooth portion and the shaft supporting portion, the method including: molding the injection molding resin gear by infusing a melted resin into void defined when a first die and a second die are mated to each other by using the first die and the second die each including a teeth forming portion configured to transfer the tooth portion formed on the outer peripheral portion; a shaft supporting portion forming portion configured to transfer the shaft supporting portion formed around a center of rotation, and a web forming portion configured to transfer the web that connects the tooth portion and the shaft supporting portion, the web forming portion configured to transfer the web including a die concave and convex having a die concave formed on the first die, and a die convex formed on the second die formed at a position corresponding to the die concave when the first die and the second die are mated to each other, and infusing the melted resin from a gate arranged at the die concave or the die convex.

Further features of the present invention will become apparent from the following description of exemplary embodiments with reference to the attached drawings.

BRIEF DESCRIPTION OF THE DRAWINGS

FIGS. 5A and 5B are explanatory drawings illustrating an injection molding resin gear of the related art.

DESCRIPTION OF THE EMBODIMENTS

This disclosure will be described in detail below.

An injection molding resin gear of this disclosure at least includes: a tooth portion having teeth formed on an outer peripheral portion thereof, a shaft supporting portion formed around a center of rotation, and a web configured to connect the tooth portion and the shaft supporting portion, the web includes a concave and convex portion having a concave portion formed on a first surface and a convex portion formed on a second surface formed at a position corresponding to the concave portion, one of the concave portion or the convex portion of the concave and convex portion includes a gate point, and the concave and convex portion include a thinned portion in a radial cross section passing through the center of rotation of the concave and convex portion.

Figure 1A:
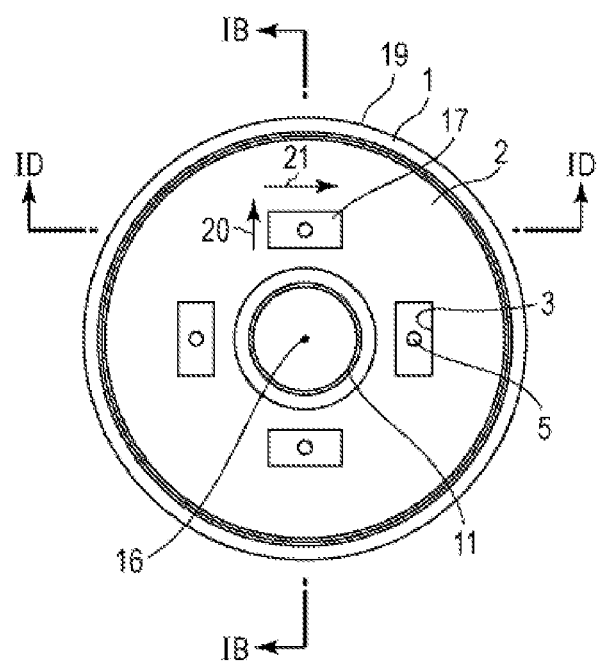
FIGS. 1A to 1D are explanatory drawings illustrating an embodiment of an injection molding resin gear of this disclosure.
Figure 1B:
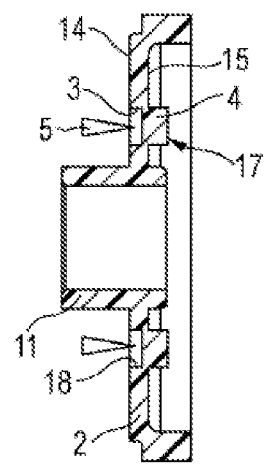
Figure 1C:
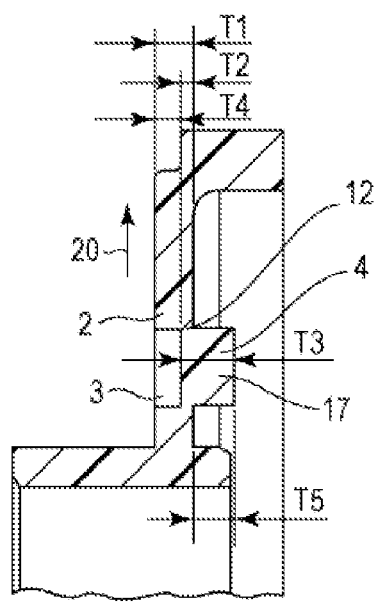
Figure 1D:
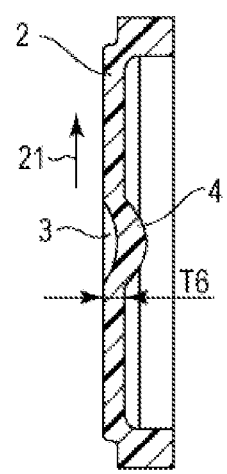

Referring now to the drawings, embodiments of this disclosure will be described. FIGS. 1A to 1D are explanatory drawings illustrating an embodiment of the injection molding resin gear of this disclosure. The injection molding resin gear of this disclosure is manufactured by using resin materials such as polyacetal, polybutylene terephthalate, polyphenylenesulfide, polyamide, and nylon and the like by injection molding. FIG. 1A is a top view of a representative injection molding resin gear (may be abbreviated as "gear", hereinafter) having a concave and convex portion 17 disposed thereon, FIG. 1B is a cross-sectional view of the gear taken along a line IB-IB, FIG. 1C is an enlarged view of the concave and convex portion 17, and FIG. 1D is a cross-sectional view of the concave and convex portion 17 taken along a line ID-ID the gear in a direction at a right angle to a radial direction thereof.

The injection molding resin gear of this disclosure includes a tooth portion (not illustrated) having teeth formed on an outer peripheral portion thereof, a shaft supporting portion 11 formed around a center of rotation 16, and a web 2 configured to connect the tooth portion and the shaft supporting portion. Reference numeral 1 denotes a rim of a gear, and is arranged coaxially with an axis of the center of rotation 16 of the gear. The tooth portion, which is not illustrated, is provided on an outer peripheral portion of the rim 1. The web 2 extends in a flat disc shape from an inner peripheral surface of the rim 1 in an axial direction of the center of rotation 16.

In FIG. 1B, the web 2 includes the concave and convex portion 17 having a concave portion 3 formed on a first surface 14 and a convex portion 4 formed on a second surface 15 formed at a position corresponding to the concave portion. Reference numeral 3 denotes a concave portion existing on one side of the web 2, and reference numeral 4 denotes a convex portion existing on a surface of the web opposite to the concave portion 3. Four of the concave and convex portions 17 are arranged on a concentric circle equidistantly. With the arrangement of the concave and convex portions 17 on a front surface and a back surface of the web so as to oppose each other, thinned portions 12 exist in a cross section of the concave and convex portions 17 in a radial direction 20 passing through centers of rotation. Reference numeral 5 denotes a gate as an infusion port of a melted resin. Here, the gate 5 is arranged in one of the concave portion and the convex portion of the concave and convex portion 17. One of the concave portion and the convex portion of the concave and convex portion includes a gate point 18 of a gate 5.

In FIG. 1C, reference sign T1 denotes a thickness of the web 2, reference sign T2 denotes a thickness of a thinned portion 12, reference sign T3 denotes a thickness of the concave and convex portion 17 in the direction at a right angle to the radial direction 20 passing through the center of rotation, reference sign T4 denotes a depth of the concave portion, and reference sign T5 denotes a thickness of the convex portion. In a cross section of the concave and convex portion 17 in the radial direction 20 passing through the center of rotation, the thickness T2 of the thinned portion corresponds to the difference between the thickness T1 of the web and the depth T4 of the concave portion (T2=T1−T4).

In the cross section of the concave and convex portion 17 in the radial direction passing through the center of rotation, the thickness T3 of the concave and convex portion 17 corresponds to a sum of the thickness T2 of the thinned portion and the thickness T5 of the convex portion, (T3=T2+T5). The thickness T3 of the concave and convex portion 17 can be equal to or thicker than the thickness T1 of the web.

In FIG. 1D, in the cross section of the concave and convex portion in a circumferential direction 21 at a right angle with respect to the radial direction 20 passing through the center of rotation, a thickness T6 of an end portion of the concave portion 3 in the circumferential direction 21 is equal to the thickness T1 of the web (T6=T1).

In this disclosure, the shape in plan view of the concave portions formed in the web is a quadrangle having at least a pair of linear or arc shaped opposed sides.

Figure 2:
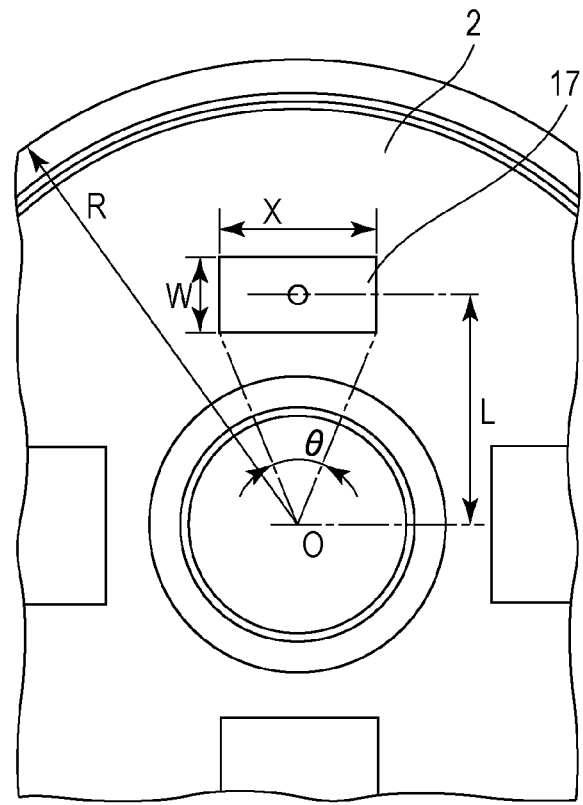
FIG. 2 is a top view of a periphery of concave and convex portions of the injection molding resin gear of this disclosure.

FIG. 2 is a top view of a periphery of the concave and convex portion 17 of the injection molding resin gear of this disclosure. An angle θ is an angle formed by segments connecting the center of rotation 16, which is referred to as O, of the injection molding resin gear and both ends of the width X, that is, one side of the concave and convex portion 17 formed in the web 2 in the circumferential direction of the concave and convex portion 17, and W denotes the width of the concave and convex portion 17 in the radial direction, and X denotes the width in the circumferential direction. Reference sign L denotes a distance from the center of rotation O of the gear to the gate 5, and reference sign R is a distance from the center of rotation O of the gear to a distal end of an addendum circle 19 (FIG. 1A). A value W falls within a range from 1.5 mm to 4 mm, inclusive, and more preferably, from 2.5 mm to 3.5 mm, inclusive. A value X falls within a range from 2 mm to 12 mm, inclusive, and, more preferably, from 4 mm to 8 mm, inclusive. A value L falls within a range from 7 mm to 11 mm, inclusive, and, more preferably, from 5 mm to 10 mm, inclusive.

The number of the concave and convex portions to be formed in the web is plural, preferably, three or more, further preferably from four to six inclusive.

In FIG. 2, in the plan view viewed from one side of the web, an angle θ(°) formed from segments connecting the center of rotation and the both ends of one side of the concave portion facing the center of rotation can satisfy a relationship, 360/{G×2(G−3)}≤θ≤360/G when G is G≥4, and satisfies a relationship, θ=360/G at the time of G=3, where G is the number of the gate points arranged on the concave portion or the convex portion.

Figure 3:
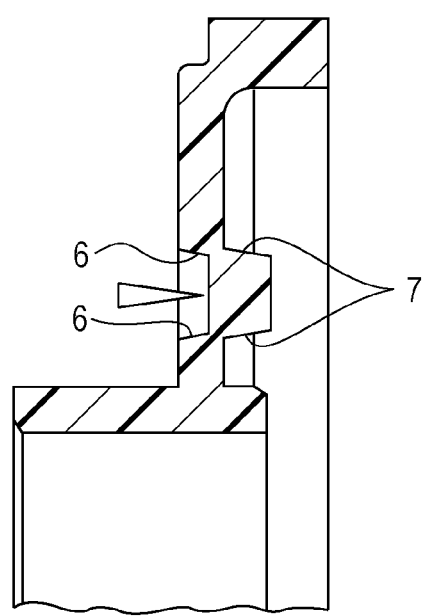
FIG. 3 is a drawing illustrating the concave and convex portions of the injection molding resin gear according to another embodiment of this disclosure.

FIG. 3 is a drawing illustrating the concave and convex portion of the injection molding resin gear according to another embodiment of this disclosure.

Either one or both surface of the concave portion and the convex portion of the concave and convex portion 17 of the injection molding resin gear of this disclosure may be vertical or inclined surface. FIG. 3 illustrates a cross section of the gear in the radial direction in the case where a vertical wall 6 of the concave portion of the concave and convex portions in the radial direction or a vertical wall 7 of the convex portion in the radial direction are inclined surface.

Figure 4A:
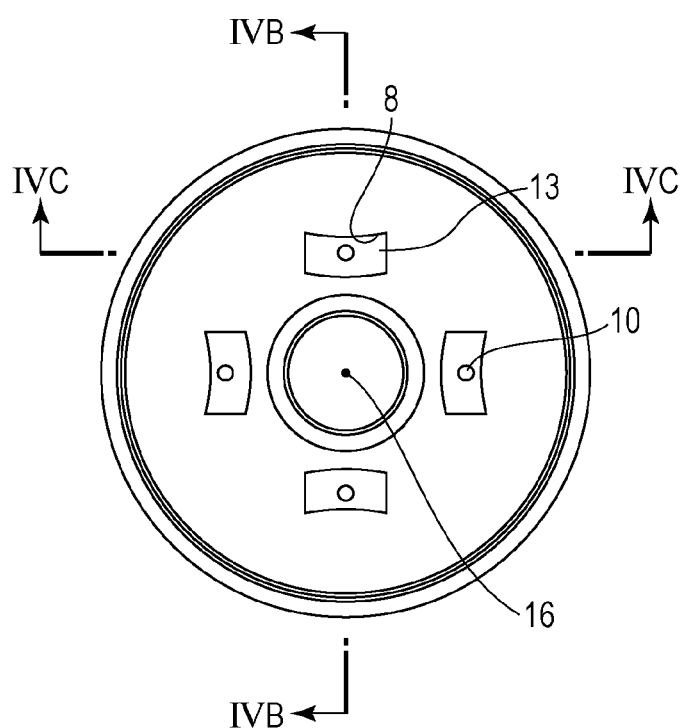
FIGS. 4A to 4C are explanatory drawings illustrating another embodiment of the injection molding resin gear of this disclosure.
Figure 4B:
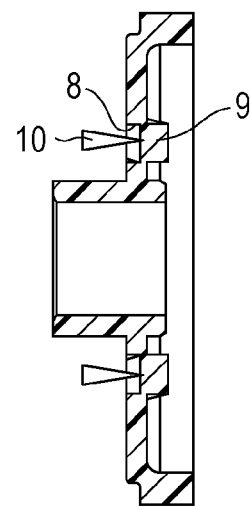
Figure 4C:
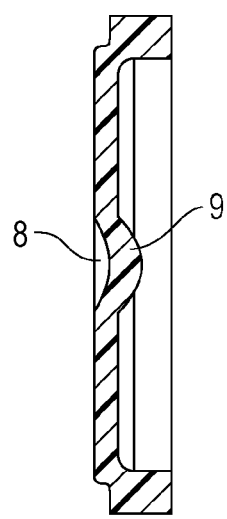

FIGS. 4A to 4C are explanatory drawings illustrating another embodiment of the injection molding resin gear of this disclosure. FIG. 4A is a top view when a concave and convex portion 13 has a fan shape, FIG. 4B is a cross section taken along the line IVB-IVB of the gear having the concave and convex portion 13 disposed thereon, and FIG. 4C is a cross-sectional view of the gear of the concave and convex portion 13 taken along the line IVC-IVC in the direction as a right angle with respect to the radial direction. Reference numeral 8 denotes a concave portion existing on one side of the web, and reference numeral 9 denotes a convex portion existing on a surface of the web opposite to the concave portion. Reference numeral 10 denotes a gate, which is an infusion port of the melted resin. The concave portion 8 of the concave and convex portion 13 has a quadrangle shape having a pair of arc-shaped opposing sides, and a center of curvature of the arc is located on the side opposite to the center of rotation 16 when viewed from the center of rotation 16.

FIGS. 5A and 5B are explanatory drawings illustrating the injection molding resin gear of the related art. FIG. 5A illustrates a tendency of filling of the resin of the gear, and FIG. 5B is a cross-sectional view taken along the line VB-VB of the gear in the radial direction. Reference numeral 50 denotes gates as infusion ports of the melted resin, and reference numeral 51 denotes a difference of filling of the resin between portions in the vicinity of the gates and the gates. In a resin filling method of the related art, as described above, the resin infused from adjacent gates is filled into a cavity in the radial direction. Therefore, in comparison with the portions in the vicinity of the gates, filling of the resin in the intermediate portions between the gates is delayed, and hence the filling of the resin into the tooth portion becomes uneven, so that the tooth plane accuracy is adversely affected.

Therefore, in order to correct the unevenness of the resin filling caused by the arrangement of the gates, the concave and convex portion of this disclosure is provided with the thinned portion 12 (thickness T2) which functions as a squeezed portion at an end in the radial direction closer to the tooth portion from the each gate, so that a resin flow resistance is increased, and the filling can be delayed. In addition, the thickness T3 of the concave and convex portion 13 is set to be equal to or larger than the thickness T1 of the web, so that the resin flow resistance is reduced, and hence the filling of a portion between the gates is accelerated, and the unevenness of the resin filling into the tooth portion is reduced.

Figure 6A:
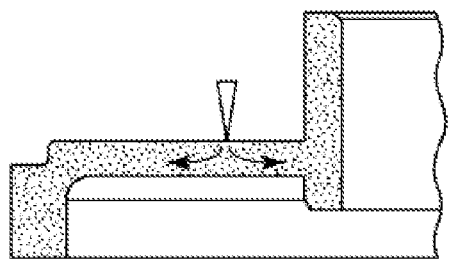
FIGS. 6A to 6C are drawings illustrating tendencies of filling of resin from a gate in comparison between this disclosure and the related art.
Figure 6B:
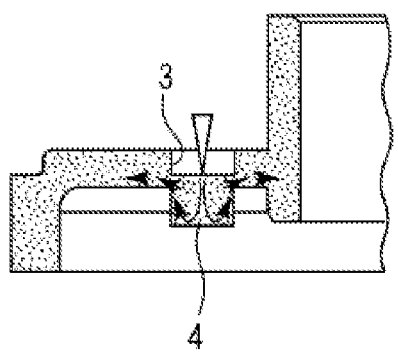
Figure 6C:
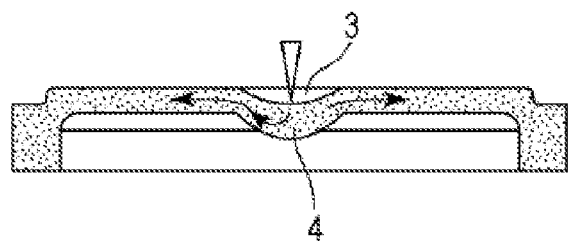

FIGS. 6A to 6C are drawings illustrating tendencies of the filling of the resin from a gate in comparison between this disclosure and the related art. FIG. 6A is a drawing illustrating a tendency of filling of the resin of the related art. In the related art, the resin filled from the gate extends in a manner of a concentric circle.

FIGS. 6B and 6C are drawing illustrating a tendency of the filling of the resin of this disclosure. FIG. 6B shows a tendency of the resin flow in the radial direction of the concave and convex portion. The resin filled from the gate hits against the convex portion first, then, bypasses the convex portion and extends in the radial direction, so that the flow resistance is increased, and the effect of restraint of the resin in the radial direction is increased. FIG. 6C illustrates a tendency of the resin flow at the concave and convex portion in the circumferential direction. The flow resistance of the resin filled from the gate is low and hence the resin flow in the circumferential direction may be improved. It is effective to set the distance L form a center of gear O to the gate to a distance up to half a gear radius R, and the width W of the concave and convex portion in the radial direction to a value not lower than 2.5 mm.

Subsequently, a method of manufacturing the injection molding resin gear of this disclosure will be described.

Figure 7:
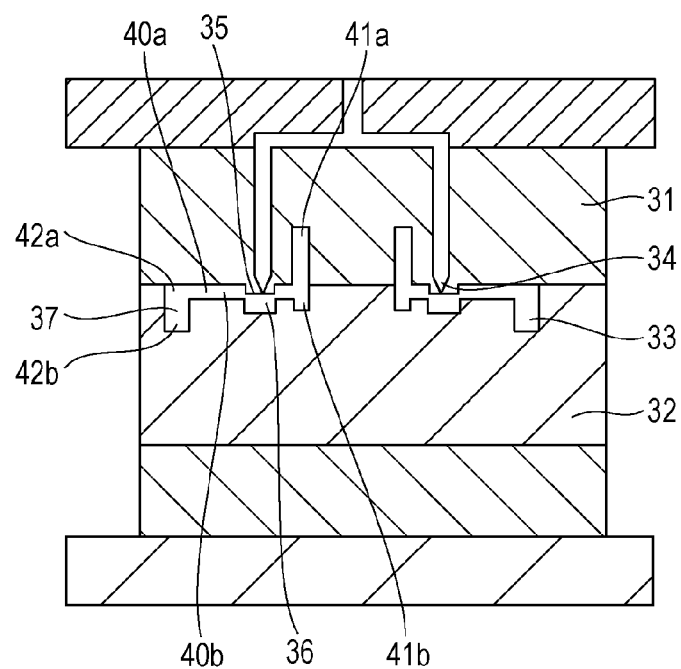
FIG. 7 is an explanatory drawing illustrating an embodiment of a method of manufacturing the injection molding resin gear of this disclosure.

FIG. 7 is an explanatory drawing illustrating an embodiment of the method of manufacturing the injection molding resin gear of this disclosure. In FIG. 7, reference numeral 31 denotes a first die, reference numeral 32 denotes a second die, reference numeral 33 denotes a void, reference numeral 34 denotes a gate, reference numeral 35 denotes a die concave, and reference numeral 36 denotes a die convex. This disclosure provides the method of manufacturing the injection molding resin gear including a tooth portion having teeth formed on an outer peripheral portion thereof, a shaft supporting portion formed around a center of rotation, and a web configured to connect the tooth portion and the shaft supporting portion, wherein molding the injection molding resin gear by infusing a melted resin into void 33 defined when the first die 31 and the second die 32 are mated to each other by using the first die 31 and the second die 32 each including a teeth forming portions 42a and 42b configured to transfer the tooth portion formed on the outer peripheral portion; shaft supporting portion 41a and 41b forming portion configured to transfer the shaft supporting portion formed around the center of rotation, and web forming portions 40a and 40b configured to transfer the web that connects the tooth portion and the shaft supporting portion, the web forming portions 40a and 40b configured to transfer the web including a plurality of die concave and convex portions 37 having a die concave 35 formed on the first die 31, and a die convex 36 formed on the second die formed at a position corresponding to the die concave when the first die and the second die are mated to each other, and infusing the melted resin from a gate 34 arranged at the die concave or the die convex.

The void 33 is formed with a portion narrowed by the die concave 35 and the die convex 36 in the radial direction passing through the center of rotation. The resin flow in the radial direction infused from the gate 34 is characterized by being restrained in comparison with the resin flow in the void 33 in the circumferential direction.

This disclosure provides the injection molding resin gear which achieves evenness of the resin flow without increasing the thickness or the diameter of the web or changing the web height as in the related art and the method of manufacturing the injection molding resin gear.

This disclosure resolves the unevenness of the resin filling in the tooth portion caused by the arrangement of the gates of the injection molding resin gear using a plurality of gates, increases in accuracy and influence of the shaft supporting portion on the accuracy due to the gates is reduced, lowering of bending rigidity of the web and influence on the tooth plane accuracy caused by the provision of the concave and convex portions including the concave portions on the first surface and the convex portions on the second surface formed on the web are prevented.

This disclosure relates to the injection molding resin gear having a cylindrical rim having teeth formed on an outer periphery thereof and a web joined to an inner peripheral surface of the rim. The web includes the concave portions on the first surface and the convex portions on the second surface on the side corresponding thereto, the gates are disposed on one of the concave portions or the convex portions, the concave portion includes thinned portions at both end portions thereof in the radial direction, a flow in the radial direction may be restrained by squeezing the resin flow by the thinned portions, and molding of the gear having a higher degree of accuracy is achieved by delaying the filling to the tooth portion and the shaft supporting portion, which are at a short flow distance from the gates.

Furthermore, when the outer diameter of the gear is constant, the flow can be improved without the association of the addition such as the increase in number of gate points. Therefore, not only the amount of usage of the material can be reduced, but also the cost of the injection molding resin gear can be restrained to a low coast.

The thickness of the concave and convex portion may be set to be thicker than the web because the flow in the circumferential direction is accelerated. Accordingly, the flow in the circumferential direction is accelerated, and control of the directionality of the resin flow may be improved.

In the range where the angle θ of the groove of the concave and convex portion in the circumferential direction satisfies a relationship, $360/\{G \times 2(G-3)\} \leq \theta \leq 360/g$ when the number of gate points G is G≤4, and satisfies a relationship, $\theta = 360/G$ at the time of G=3, restraint and acceleration of the resin flow are well balanced, so that molding of the gear with high degree of accuracy is achieved.

With the concave and convex portion formed into a quadrangle having a pair of sides facing a final filling portion formed into an arc shape, the direction of resin flow is directed toward the final filling portion. Consequently, the uneven difference of the rein flow is further improved, and molding of the gear with still higher degree of accuracy is achieved.

EXAMPLES

Example 1

The gear having an addendum circle diameter of Φ37.92 mm, a module of 0.8, a pressure angle of 14.5°, and a number of teeth of 45 was used. The shape of the concave and convex portion was a quadrangle, all of opposed sides of which were straight, and the width W of the concave and convex portion in the radial direction was 3.0 mm and the width X in the circumferential direction was 6.2 mm. The thickness T1 of the web from the center of rotation was 1.5 mm, and the distance L to the gate was 9 mm. The thickness T2 of the thinned portion of the concave and convex portion was 0.5 mm, and the thickness T3 of the concave and convex portion passing through the center of rotation in the direction at a right angle to the radial direction was 1.5 mm, which was the same as the web. The injection molding resin gear was manufactured with four gate points, and an angle θ formed by the width of the concave convex shape in the circumferential direction of 60°.

Comparative example 1 was a gear as illustrated in FIG. 6A, and was a gear having four gate points and corresponding to the injection molding resin gear of the related art.

A comparison of cases where the concave and convex portion of Comparative Example 1 and that of Example 1 were disposed will be shown in Table 1. The difference between a maximum distance and a minimum distance from the center of the gear at a distal end of the flow at the time when the distal end of the resin reached the tooth portion, that is, 62% of the volume of the mold was filled was evaluated as a flow distance difference.

TABLE 1

|  | Comparative Example 1 | Example 1 |
|---|---|---|
| Number of gate points G | 4 | 4 |
| Angle θ (°) | Nil | 60 |
| Thickness T3 (mm) |  | 1.5 |
| Concave and convex shape |  | Straight |
| Flow distance difference (mm) | 3.42 | 0.63 |
| Determination | X | ○ |

However, a double circle mark of the determination means no influence of the flow distance difference, a circle mark of determination means that the influence of the flow distance difference is small, a triangle mark of determination means that the influence of the flow distance difference is medium, and a cross mark of determination means that the influence of the flow distance difference is significant.

As illustrated in Table 1, in Comparative Example 1, there was a flow distance difference of 3 mm or more, but in Example 1, it was confirmed that the flow distance difference was restrained to a value of 1 mm or smaller by disposing the concave and convex portion, and an effect of improvement of the uneven difference of the resin flow was seen.

Examples 2 to 5

In Example 1, the injection molding resin gears from Example 2 to 5 were manufactured in the same manner as Example 1 except that the thickness T3 in the direction at a right angle with respect to the radial direction passing through the center of rotation of the concave and convex portion.

The result of the case where the concave and convex portions of Examples 2 to 5 are disposed is shown in Table 2.

TABLE 2

|  | Comparative Example 1 | Example 2 | Example 1 | Example 3 | Example 4 | Example 5 |
|---|---|---|---|---|---|---|
| Number Of Gate Points G | 4 | 4 | 4 | 4 | 4 | 4 |
| Angle θ(°) | Nil | 60 | 60 | 60 | 60 | 60 |
| Thickness T3(mm) |  | 1 | 1.5 | 2 | 2.5 | 3 |

TABLE 2-continued

|  | Comparative Example 1 | Example 2 | Example 1 | Example 3 | Example 4 | Example 5 |
|---|---|---|---|---|---|---|
| Concave And Convex Shape |  | Straight | Straight | Straight | Straight | Straight |
| Flow Distance Difference(mm) | 3.42 | 1.02 | 0.63 | 0.43 | 0.36 | 0.33 |
| Determination | X | Δ | ○ | ○ | ○ | ○ |

As shown in Table 2, in this disclosure it was confirmed that the flow distance difference was reduced by disposing the concave and convex portion, and that if the value T3 was set to the web thickness T1 or larger, the flow between the gates is further accelerated, and the flow distance difference was reduced. However, if the thickness exceeds 2 mm, no significant change was observed.

From Example 6 to 12, Comparative Examples 2 to 3

In Examples 6 to 12, the injection molding resin gear was manufactured in the same manner as Example 1 except that the thickness T3 of the concave and convex portion in the direction at a right angle with respect to the radial direction passing through the center of rotation, the number of the gate points was changed to 3, 4, and 6, and the angle θ formed by the width of the concave and convex portion in the circumference direction with the center of rotation was changed to 10°, 30°, 45°, 70°, 110°, and 120°. The result is shown in Table 3.

Comparative Examples 2 and 3 corresponds to the injection molding resin gears using the related art which improves the flow distance difference by increasing the number of the gate points in the gear as illustrated in FIG. 6A.

TABLE 3

|  | Comparative Example 2 | Comparative Example 1 | Comparative Example 3 | Example 6 | Example 7 | Example 8 | Example 9 | Example 10 | Example 11 | Example 12 |
|---|---|---|---|---|---|---|---|---|---|---|
| Number Of Gate Points G | 3 | 4 | 6 | 3 | 3 | 4 | 4 | 4 | 6 | 6 |
| Angle θ(°) | Nil | Nil | Nil | 110 | 120 | 30 | 45 | 70 | 10 | 30 |
| Thickness T3(mm) |  |  |  | 2 | 2 | 2 | 2 | 2 | 2 | 2 |
| Concave And Convex Shape |  |  |  | Straight | Straight | Straight | Straight | Straight | Straight | Straight |
| Flow Distance Difference (mm) | 8.4 | 3.42 | 1.81 | 1.02 | 0.88 | 1.01 | 0.63 | 0.21 | 0.55 | 0.2 |
| Determination | X | X | X | Δ | ○ | Δ | ○ | ⊙ | ○ | ⊙ |

As shown in Table 3, it was found that the flow distance difference was reduced by increasing the angle θ formed by the width in the circumferential direction with the center of rotation. Generally speaking, a state in which $360/\{G \times 2(G-3)\} \leq \theta$ was satisfied when the number of gate points G was $G \geq 4$, and $360/G$ was satisfied when the number of gate points G is $G \geq 3$ was effective.

Subsequently, from Example 9, the total pitch engagement error of the resin gear obtained by injection molding with four gate points and a groove angle θ=45° formed by the width in the circumferential direction with the center of rotation was measured by an engagement measurement instrument (GTR-4 manufactured by Osaka Seimitsu Kikai Co., Ltd). The total pitch engagement error of the resin gear of Comparative Example 1 was also measured. The result is shown in Table 4.

TABLE 4

|  | Comparative Example 1 | Example 9 |
|---|---|---|
| Number Of Gate Points G | 4 | 4 |
| Angle θ (°) | Nil | 45 |
| Thickness T3 (mm) |  | 2 |
| Concave And Convex Shape |  | Straight |
| Total Pitch Engagement Erro r(μm) | 20.5 | 14.1 |

As illustrated in Table 4, in Comparative Example 1, the total pitch engagement error was 20.5 μm. However, in Example 9, the total pitch engagement error was 14.1 μm, and an effect of improvement of approximately 30% was observed. As show in Table 4, the total pitch engagement error was improved more than Comparative Example 1 by improving the uneven difference of the resin flow with the configuration of this disclosure.

From Examples 13 to 14

The angle θ formed by the width of the concave and convex shape with the center of rotation when the concave and convex portion having a pair of opposed sides having an arc shape as illustrated in FIG. 4 was changed to 35°, 60° and the injection molding resin gears having the four gate points were manufactured as in FIG. 4. The result is shown in Table 5.

TABLE 5

|  | Comparative Example 1 | Example 8 | Example 9 | Example 10 | Example 13 | Example 14 |
|---|---|---|---|---|---|---|
| Number Of Gate Points G | 4 | 4 | 4 | 4 | 4 | 4 |

TABLE 5-continued

|  | Comparative Example 1 | Example 8 | Example 9 | Example 10 | Example 13 | Example 14 |
|---|---|---|---|---|---|---|
| Angle θ(°) | Nil | 30 | 45 | 70 | 35 | 60 |
| Thickness T3(mm) |  | 2 | 2 | 2 | 2 | 2 |
| Concave And Convex Shape |  | Straight | Straight | Straight | Arc | Arc |
| Flow Distance Difference(mm) | 3.42 | 1.01 | 0.63 | 0.21 | 0.67 | 0.25 |
| Determination | X | Δ | ○ | ⊙ | ○ | ⊙ |

As illustrated in Table 5, the flow distance difference of Example 13 was confirmed to achieve the effect equivalent to the case where the angle formed by the width in the circumferential direction with the center of rotation is reduced by an angle on the order of 10° was obtained in comparison with the case where the concave and convex portion was straight as in Example 9.

Example 15

Subsequently, the angle θ formed by the width of the concave and convex portion in the circumferential direction with the center of rotation was changed into 45° when a pair of the sides of the concave and convex portion opposing to each other as illustrated in FIG. 4 were an arc shape, and the total pitch engagement error of the resin gear obtained by injection molding with four gate points was measured by an engagement measurement instrument (GTR-4 manufactured by Osaka Seimitsu Kikai Co., Ltd). The total pitch engagement error of the resin gear of Comparative Example 1 was also measured. The result is shown in Table 6.

TABLE 6

|  | Comparative Example 1 | Example 9 | Example 15 |
|---|---|---|---|
| Number Of Gate Points G | 4 | 4 | 4 |
| Angle θ (°) | Nil | 45 | 45 |
| Thickness T3 (mm) |  | 2 | 2 |
| Concave And Convex Shape |  | Straight | Arc |
| Total Pitch Engagement Error (μm) | 20.5 | 14.1 | 11.5 |

As illustrated in Table 6, in Example 9, the total pitch engagement error was 14.1 μm. However, in Example 15, the total pitch engagement error was 11.5 μm, and an effect of improvement of approximately 20% in comparison with the case where the concave and convex portion was straight was observed.

This disclosure is capable of providing the injection molding resin gear with high degree of accuracy by resolving the unevenness of the resin flow caused by the arrangement of the gates in the web, and hence may be used widely in power transmission mechanism for image forming apparatus such as copying machines, printers, facsimile apparatus, automobile components, precise equipment, and electronic equipment.

According to the invention, an injection molding resin gear having a high degree of accuracy in which the unevenness of a resin flow caused by the arrangement of gates in a web is resolved, and a method of manufacturing the injection molding resin gear are provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-265723, filed Dec. 24, 2013, which is hereby incorporated by reference herein in its entirety.

What is claimed is:

1. An injection molding resin gear for an image forming apparatus, the injection molding resin gear comprising:
   a tooth portion having teeth and a rim, wherein the teeth have a tooth plane and are formed on an outer peripheral portion of the rim to extend towards an addendum circle;
   a shaft supporting portion formed around a shaft center of rotation; and
   a web that connects the tooth portion and the shaft supporting portion and includes a plurality of concave/convex portions,
   wherein each concave/convex portion includes a concave portion formed on a first surface, a convex portion formed on a second surface at a position corresponding to the concave portion, and a thinned portion orientated in a radial direction that passes through a concave/convex portion rotation center of the concave/convex portion, and
   wherein one of the concave portions and the convex portions include a gate point as a point of resin entry into the injection molding resin gear,
   whereby an accuracy of the tooth plane is increased due to a thickness of the thinned portion causing resistance of resin flow from the gate point to the tooth portion and delay of resin filling in the radial direction relative to resin filling in a circumferential direction that is at a right angle with respect to the radial direction.

2. The injection molding resin gear according to claim 1, wherein, in the radial direction passing through the concave/convex portion rotation center, the thickness of the thinned portion corresponds to a difference between a thickness of the web and a depth of the concave portion.

3. The injection molding resin gear according to claim 1, wherein, in the radial direction passing through the concave/convex portion rotation center, a thickness of the concave/convex portion corresponds to a sum of the thickness of the thinned portion and a thickness of the convex portion.

4. The injection molding resin gear according to claim 1, wherein, in the cross section of the concave/convex portion in the circumferential direction, a thickness of an end portion of the concave portion in the circumferential direction is equal to a thickness of the web.

5. The injection molding resin gear according to claim 1, wherein a shape in plan view of each concave portion is a quadrangle having at least a pair of linear or arc shaped opposed sides.

6. The injection molding resin gear according to claim 1, wherein, in plan view viewed from one side of the web, an angle θ(°) formed from segments connecting the shaft center of rotation and both ends of one side of the concave portion facing the shaft center of rotation satisfies a relationship $360/\{G \times 2(G-3)\} \leq \theta \leq 360/G$ when a number of gate points, G, is $G \geq 4$, and satisfies a relationship $\theta = 360/G$ when $G=3$.

7. The injection molding resin gear according to claim 1, wherein the concave portion has a quadrangle shape that includes a pair of arc-shaped opposing sides, wherein a center of curvature of an arc of an arc-shaped opposing side is located on a side opposite to the shaft center of rotation when viewed from the shaft center of rotation.

8. An injection molding resin gear according to claim 1 produced by a manufacturing process, the manufacturing process comprising
    infusing a melted resin into a void defined when a first die and a second die are mated to each other by using the first die and the second die, each including a teeth forming portion configured to transfer the tooth portion formed on the outer peripheral portion;
    transferring the shaft supporting portion formed around the shaft center of rotation via a shaft supporting portion forming portion, and transferring the web that connects the tooth portion and the shaft supporting portion via a web forming portion,
    wherein the web forming portion is configured to transfer the web including a die concave and convex having a die concave formed on the first die, and a die convex formed on the second die formed at a position corresponding to the die concave when the first die and the second die are mated to each other, and infusing the melted resin from a gate arranged at the die concave or the die convex.

9. The manufacturing process according to claim 8, wherein the void is formed with a portion narrowed by the die concave and the die convex in the radial direction passing through the shaft center of rotation, and the resin flow in the radial direction infused from the gate is characterized by being restrained in comparison with the resin flow in the void in the circumferential direction.

10. The injection molding resin gear according to claim 1, wherein a surface of a concave portion is an inclined surface.

11. The injection molding resin gear according to claim 1,
    wherein each concave/convex portion further includes a second portion orientated in a circumferential direction that passes through the concave/convex portion rotation center,
    wherein the circumferential direction is at a right angle with respect to the radial direction, and
    wherein the second portion has a thickness that is greater than a thickness of the thinned portion.

12. A power transmission mechanism for an image forming apparatus, the power transmission mechanism comprising:
    the injection molding resin gear according to claim 1; and
    a second gear configured to transfer power between the injection molding resin gear and the second gear.

13. An injection molding resin gear comprising:
    a tooth portion having teeth and a rim, wherein the teeth are formed on an outer peripheral portion of the rim;
    a shaft supporting portion formed around a center of rotation; and
    a web that connects the tooth portion and the shaft supporting portion,
    wherein the web includes a plurality of concave portions and a plurality of convex portions having a concave portion formed on a first surface and a convex portion formed on a second surface formed at a position corresponding to the concave portion,
    wherein the web includes a thinned portion between the concave portion and the convex portion in a radial direction passing through the center of rotation, and
    wherein a thickness of the thinned portion is a difference between a thickness of the web and a depth of the concave portion.

14. The injection molding resin gear according to claim 13, wherein, in the radial direction passing through the center of rotation, a thickness of the concave/convex portion is a sum of the thickness of the thinned portion and a thickness of the convex portion.

15. The injection molding resin gear according to claim 13, wherein, in a cross section of the concave/convex portion in a circumferential direction, a thickness of an end portion of the concave portion in the circumferential direction is equal to a thickness of the web.

16. The injection molding resin gear according to claim 13, wherein a shape in plan view of each concave portion is a quadrangle having at least a pair of linear or arc shaped opposed sides.

17. A printer comprising the injection molding resin gear according to claim 13.

18. A copying machine comprising the injection molding resin gear according to claim 13.

* * * * *